No. 779,854. PATENTED JAN. 10, 1905.
W. T. & F. A. IDDINGS.
TUBULAR LANTERN.
APPLICATION FILED JUNE 7, 1904.
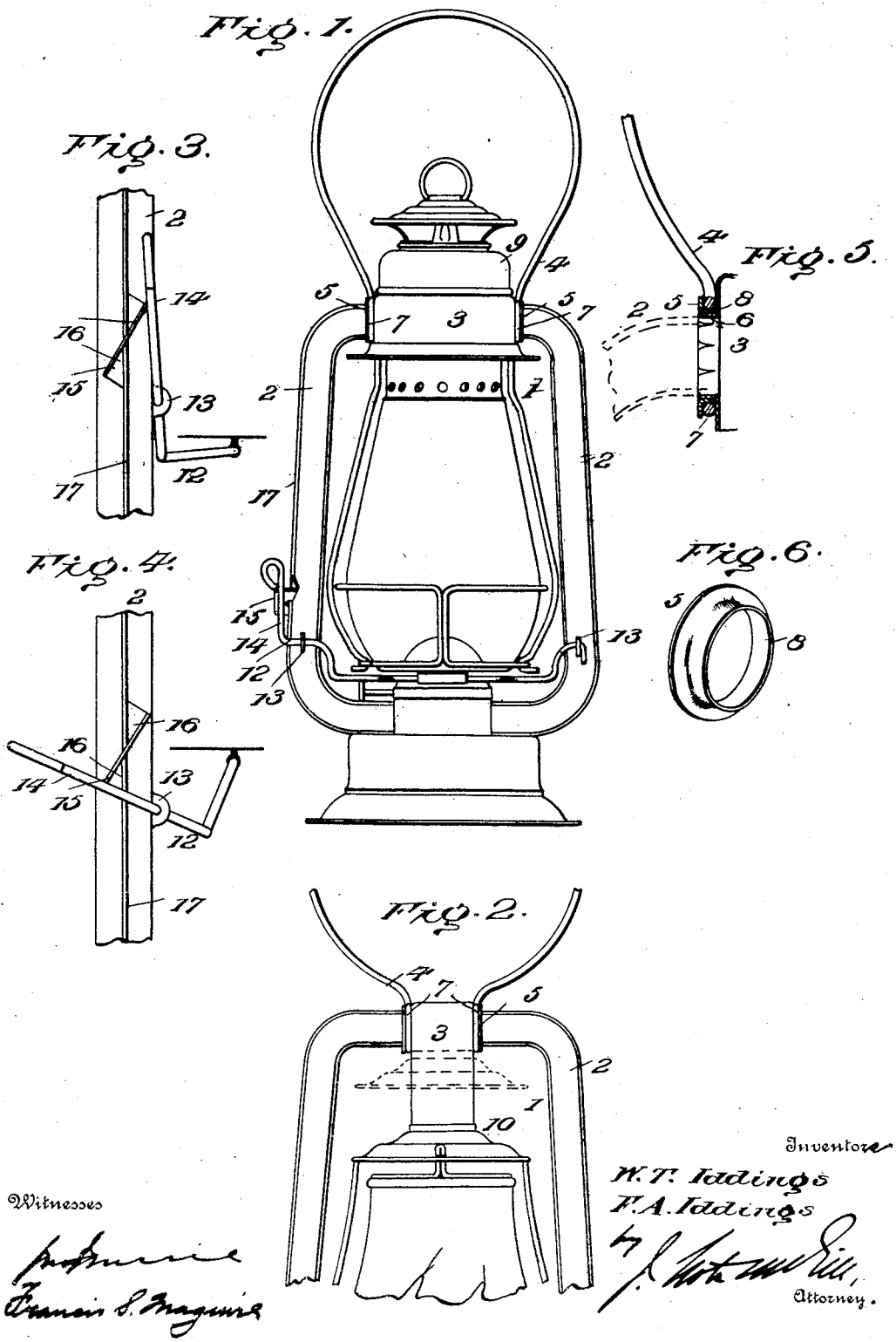
Witnesses
Inventors
W. T. Iddings
F. A. Iddings
Attorney.

No. 779,854. Patented January 10, 1905.

UNITED STATES PATENT OFFICE.

WILLIAM T. IDDINGS AND FRANK A. IDDINGS, OF WARREN, OHIO.

TUBULAR LANTERN.

SPECIFICATION forming part of Letters Patent No. 779,854, dated January 10, 1905.

Application filed June 7, 1904. Serial No. 211,496.

*To all whom it may concern:*

Be it known that we, WILLIAM T. IDDINGS and FRANK A. IDDINGS, of Warren, in the county of Trumbull and State of Ohio, have invented certain new and useful Improvements in Tubular Lanterns; and we do hereby declare the following to be a full, clear, and exact description of the invention, such as will enable others skilled in the art to which it appertains to make and use the same.

The objects of this invention are twofold—first, to provide improved means for securing the bail ends to tubular lanterns of both the cold-blast and hot-blast patterns, and, secondly, to provide simple and highly-efficient means for locking the lifting-lever in each of its two positions, so as to prevent any accidental movement of the globe in the swinging or jarring of the lantern.

The invention will be hereinafter fully set forth, and particularly pointed out in the claims.

In the accompanying drawings, Figure 1 shows in side elevation a cold-blast lantern equipped with our improvements. Fig. 2 shows the application of the bail to a hot-blast lantern. Figs. 3 and 4 show the handled end of the actuating-lever in its two positions. Fig. 5 is an enlarged sectional view through one end of the bail and its bearing. Fig. 6 is a view of the thimble or flanged ring removed.

Referring to the drawings, 1 designates the frame of a tubular lantern, the side tubes 2 of which open at the top into the central tube 3. Instead of having the bail 4 secured to the side tubes by passing its ends into openings therein we provide thimbles 5, which are made fast to flanges 6 of the central tube and which form bearings for the coiled ends of bail 7, the latter gripping the thimbles so tight as to insure the retention of the bail in any desired position. The thimble, as shown in Fig. 6, consists of a right-angularly-flanged ring, the flanges whereof serve to retain the bails as against outward slipping. The flanges 6 struck up from the central tube are preferably slitted, so that when soldering the ends of the side tubes to such flanges the thimbles will also be soldered in place. The side tubes fit, preferably, within the slitted flanges 6, and both the flanges and ends of the tubes are inclosed by the tubular portions 8 of the thimbles. The coiled ends of the bail have the thimbles positioned therein at the time the latter are secured to the flanges 6. When the parts are thus united, the thimbles form bearings for the ends of the bail, and the friction thereof holds the bail stiffly in any desired position. In Fig. 1 we have shown this means of securing a bail in what is known to the trade as the "cold-blast" type of lantern, wherein a central canopy-carrying tube 9 is movable within the central tube 3; but in Fig. 2 we have shown this feature embodied in the hot-blast lantern, the canopy 10 being movable on the central tube. In this form, as in the other, the central tube is formed with flanges 6 surrounding the openings for the side tubes, so that a firm bearing is had not only for the tubes, but also for the flanged thimbles, such bearings resisting all strain occasioned by the raising and lowering of the globe and the swinging of the lantern.

The globe-raising lever 12 is cranked, so that the globe may be moved up and down vertically, such lever being mounted in bearings 13, secured to the side tubes. The handle end 14 of this crank-lever is straight and normally occupies a vertical position, bearing against the upper end of an obliquely-positioned plate 15, so that no matter how great the jarring or swinging of the lantern the danger of the globe accidentally moving upward is avoided, it being necessary to first bear outwardly on the handled end 14 until it clears the upper corner of plate 15 before the lever may be actuated. Likewise when the lever is holding the globe raised, with the handled end bearing against the lower edge of plate 15, it is necessary to bear outwardly on such handled end until it clears the lower corner of the plate before the parts may resume their normal positions. Thus we avoid having to depend upon the springing or yielding quality of the crank-lever itself and obviate wear on the side tube, as when the latter is depended upon to hold the curved end of a lever in place.

The bearing-plate 15 is preferably formed from a single piece of metal with two wings 16 struck therefrom extended in opposite directions, so as to bear against the vertical outer seam 17, common in the tubes of this style of lantern, such seam, together with the solder, tending to insure the retention of the locking-plate in position, such plate itself protecting the seam from wear in the shifting of the lever.

We claim as our invention—

1. A tubular lantern comprising a central tube having opposite openings with surrounding flanges, side tubes coincident with and telescoped by said flanges, means for uniting the side tubes to the flanges, circular bearings surrounding said side tubes and flanges, and a bail having its ends coiled around said bearings.

2. A tubular lantern comprising a central tube having openings, side tubes coincident with said openings, a bail, and bearings therefor surrounding said side tubes at the points of coincidence with said openings, said bearings being held by the means securing said side tubes to said central tube.

3. A tubular lantern comprising a central tube having openings, flanges surrounding said openings, side tubes fitted to said flanges, flanged rings forming bail-bearings encircling said flanges, and a bail having coiled ends encircling said flanged rings.

4. A tubular lantern comprising a central tube having openings, slitted flanges surrounding said openings, side tubes fitted to said flanges, thimbles or flanged rings on said flanges, means for securing said tubes and thimbles to said flanges, and a bail having rounded ends encircling said thimbles.

5. The combination with the tubular lantern-frame, the vertically-movable globe, and the cranked lever for raising and lowering such globe, said lever having an approximately straight handled end, of a locking-plate secured to one of the side tubes and set obliquely thereon, and having its upper and lower edges right angular to the outer longitudinal edge thereof and also at right angles to said side tube, said edges being extended outward a greater distance than the plane occupied by the said handled end when in either of its two extreme positions, said plate having wings struck up therefrom and extended in opposite directions and secured to the said side tube, as described.

In testimony whereof we have signed this specification in the presence of two subscribing witnesses.

WILLIAM T. IDDINGS.
FRANK A. IDDINGS.

Witnesses:
GEO. T. HECKLINGER,
WARREN LEETE.